United States Patent
Ritchey et al.

(10) Patent No.: US 11,376,931 B2
(45) Date of Patent: Jul. 5, 2022

(54) RETRACTABLE CART ROOF SYSTEM

(71) Applicant: J AND J CREATIONS, LLC, Hoover, AL (US)

(72) Inventors: Jeremy Ritchey, Hoover, AL (US); John Joseph Bellanca, Birmingham, AL (US)

(73) Assignee: J AND J CREATIONS, LLC, Hoover, AL (US)

( * ) Notice: Subject to any disclaimer, the term of this patent is extended or adjusted under 35 U.S.C. 154(b) by 0 days.

(21) Appl. No.: 16/813,885

(22) Filed: Mar. 10, 2020

(65) Prior Publication Data
US 2021/0122218 A1 Apr. 29, 2021

Related U.S. Application Data

(60) Provisional application No. 62/926,747, filed on Oct. 28, 2019.

(51) Int. Cl.
| | | |
|---|---|---|
| *B60J 7/02* | (2006.01) | |
| *B60J 7/047* | (2006.01) | |
| *B60J 7/19* | (2006.01) | |
| *B60S 1/66* | (2006.01) | |
| *B60J 7/14* | (2006.01) | |

(52) U.S. Cl.
CPC .............. *B60J 7/022* (2013.01); *B60J 7/047* (2013.01); *B60J 7/196* (2013.01); *B60S 1/66* (2013.01); *B60J 7/026* (2013.01); *B60J 7/143* (2013.01)

(58) Field of Classification Search
CPC ... B60J 7/022; B60J 7/047; B60J 7/196; B60J 7/143; B60J 7/026
USPC ......... 296/77.1, 100.1, 99.1, 136.04, 136.06, 296/26.13, 100.6
See application file for complete search history.

(56) References Cited

U.S. PATENT DOCUMENTS

| | | | | |
|---|---|---|---|---|
| 1,425,954 | A * | 8/1922 | Fischer | E05B 77/00 296/99.1 |
| 3,292,071 | A * | 12/1966 | McLaughlin | H02J 7/0034 320/165 |
| 3,292,971 | A * | 12/1966 | Zucker | B60P 3/343 296/99.1 |
| 3,952,758 | A * | 4/1976 | Addison | B60P 3/343 135/88.07 |
| 3,957,301 | A * | 5/1976 | Huber | B60J 11/00 296/95.1 |
| 4,848,827 | A * | 7/1989 | Ou | B60J 11/00 296/99.1 |
| 5,443,300 | A * | 8/1995 | Mohammed | B60J 3/02 160/188 |
| 6,206,451 | B1 * | 3/2001 | Maano | B60J 11/00 296/136.04 |
| 6,341,811 | B1 * | 1/2002 | Schoelkopf | B60J 5/0494 296/152 |
| 6,631,943 | B2 | 10/2003 | Muller | |
| 6,782,904 | B2 * | 8/2004 | Tien | B60J 11/00 135/88.01 |
| 9,254,734 | B2 * | 2/2016 | Held | B60J 5/06 |

(Continued)

*Primary Examiner* — Dennis H Pedder
*Assistant Examiner* — Joyce Eileen Hill
(74) *Attorney, Agent, or Firm* — Gardner Groff & Greenwald, PC (57) ABSTRACT

An extendable roof system for carts, or more specifically golf carts, the extendable roof system having at least one extendable side panel stored inside a housing attached to a cart roof top, and a method of using such a system.

18 Claims, 5 Drawing Sheets

(56) References Cited

U.S. PATENT DOCUMENTS

| | | | | |
|---|---|---|---|---|
| 9,834,129 B2* | 12/2017 | Goode | ................ | B60P 3/34 |
| 9,944,215 B2* | 4/2018 | Rodabaugh | ............... | B60P 3/34 |
| 10,035,408 B2* | 7/2018 | Crismon | ................ | B60J 7/106 |
| 10,093,161 B1* | 10/2018 | Seitz, Jr. | ................ | E04H 15/06 |
| 10,525,805 B2 | 1/2020 | Seitz, Jr. et al. | | |
| 10,525,866 B2* | 1/2020 | Rodabaugh | ............... | B60P 3/36 |
| 2019/0225062 A1* | 7/2019 | Seitz, Jr. | ................ | B60J 7/102 |

* cited by examiner

RETRACTABLE CART ROOF SYSTEM

CROSS-REFERENCE TO RELATED APPLICATION

This application claims the benefit of U.S. Provisional Patent Application Ser. No. 62/926,747 filed Oct. 28, 2019, the entirety of which is hereby incorporated herein by reference for all purposes.

TECHNICAL FIELD

The present invention relates generally to the field of covers for carts, and more particularly to retractable roof systems for golf carts or other vehicles or structures.

BACKGROUND

Golf carts provide convenience, mobility and protection to their occupants. Golf carts, as commonly known in the art, include roof tops providing shade from the sun and protection from rain during inclement weather. Some golf carts also feature windshields in the front and awnings in the rear to provide further protection for the cart's occupants and to protect golf clubs and other equipment. However, many golf carts do not provide protection on the sides. Fully enveloping plastic covers are available but are known to create uncomfortable conditions for occupants in hot and humid environments, and inconvenience in use. It is to the provision of an improved cart roof top with extendable side panels meeting these and other needs that the present invention is primarily directed.

SUMMARY

In example embodiments, the present invention provides improved roof tops for carts such as golf carts and for other vehicles or structures, and improved methods for using such roof tops. Roof tops according to example embodiments of the invention include a top panel, at least one extension panel, and a housing for storing, deploying, and securing the at least one extension panel during storage and use.

In one aspect, the present invention relates to a roof top assembly for carts. The roof top assembly includes a roof top panel, a panel housing, and at least one extension panel. When additional side coverage of a cart is not required, the at least one extension panel is stored within the panel housing which includes an integrated channel or storage compartment configured for securing the at least one extension panel in a storage position. When additional side coverage is preferred or required, the extension panel is extended from its storage position within the panel housing and locked or otherwise retained in an extended position outside of the storage compartment.

In another aspect, the invention relates to a replacement or retrofit roof system for golf carts. The replacement roof system is a replacement for existing golf cart roof tops and is configured to attach to the existing golf cart top support frames. The replacement roof system has a radial or angled profile and includes a roof top panel with an integrated housing for holding one or more retractable side panels. The housing comprises one or more channels configured for holding the extendable side panels and provides a sliding mechanism for moving the extendable panels in and out of the housing. The radial or angled profile can further reduce the effort or force required to extend the retractable side panels or allow for full extension of the side panels through gravitation alone once released from the housing. Further, the sliding retractable side panels can be locked to a desired extended position or stored away in the housing in a storage position.

In still another aspect, the invention relates to a retractable canopy accessory for golf carts. The canopy accessory is an attachment accessory that can be retrofitted onto existing golf cart roof tops. The retractable canopy accessory has a housing with at least one extension side panel secured therein. The side panel is configured to move in and out of the housing and can be locked to any extended or stored position.

These and other aspects, features and advantages of the invention will be understood with reference to the drawing figures and detailed description herein and will be realized by means of the various elements and combinations particularly pointed out in the appended claims. It is to be understood that both the foregoing general description and the following brief description of the drawings and detailed description of example embodiments are explanatory of example embodiments of the invention, and are not restrictive of the invention, as claimed.

DETAILED DESCRIPTION OF EXAMPLE EMBODIMENTS

The present invention may be understood more readily by reference to the following detailed description of example embodiments taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
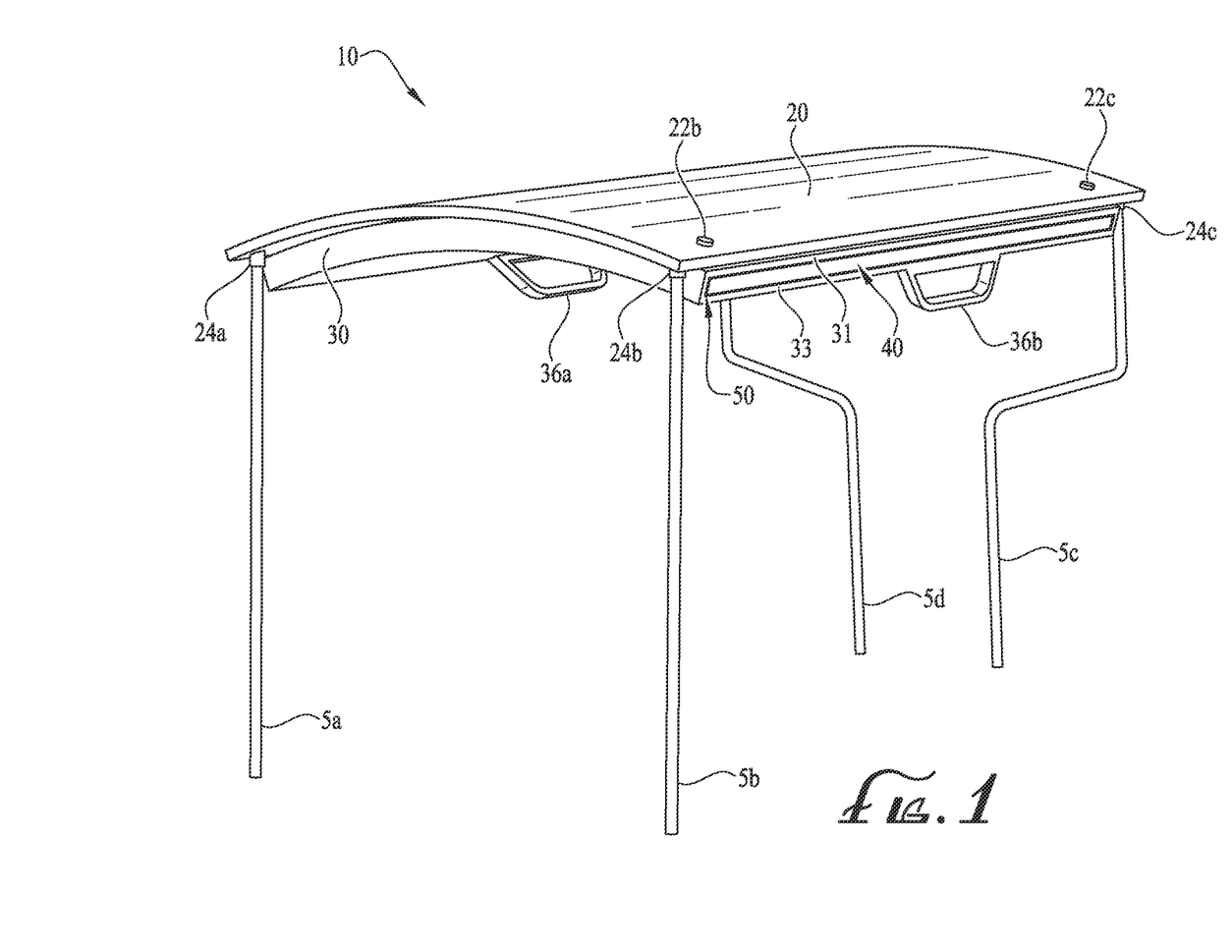
FIG. 1 is a perspective view of a curved cart roof assembly with retracted side panels according to an example embodiment of the present invention.

With reference now to the drawing figures, wherein like reference numbers represent corresponding parts throughout the several views, FIG. 1 shows a retractable cart roof system or assembly 10 secured to frames or supports 5a-5d of a cart, such as for example a golf cart. The roof assembly 10 includes a main or central top panel or roof 20, a housing or storage compartment 30, and one or more side or extension panel(s) 40. The roof assembly 10 also includes a plurality of frame securing elements 24a-24d used to secure the roof assembly 10 to the cart frame supports 5a-5d.

Figure 2:
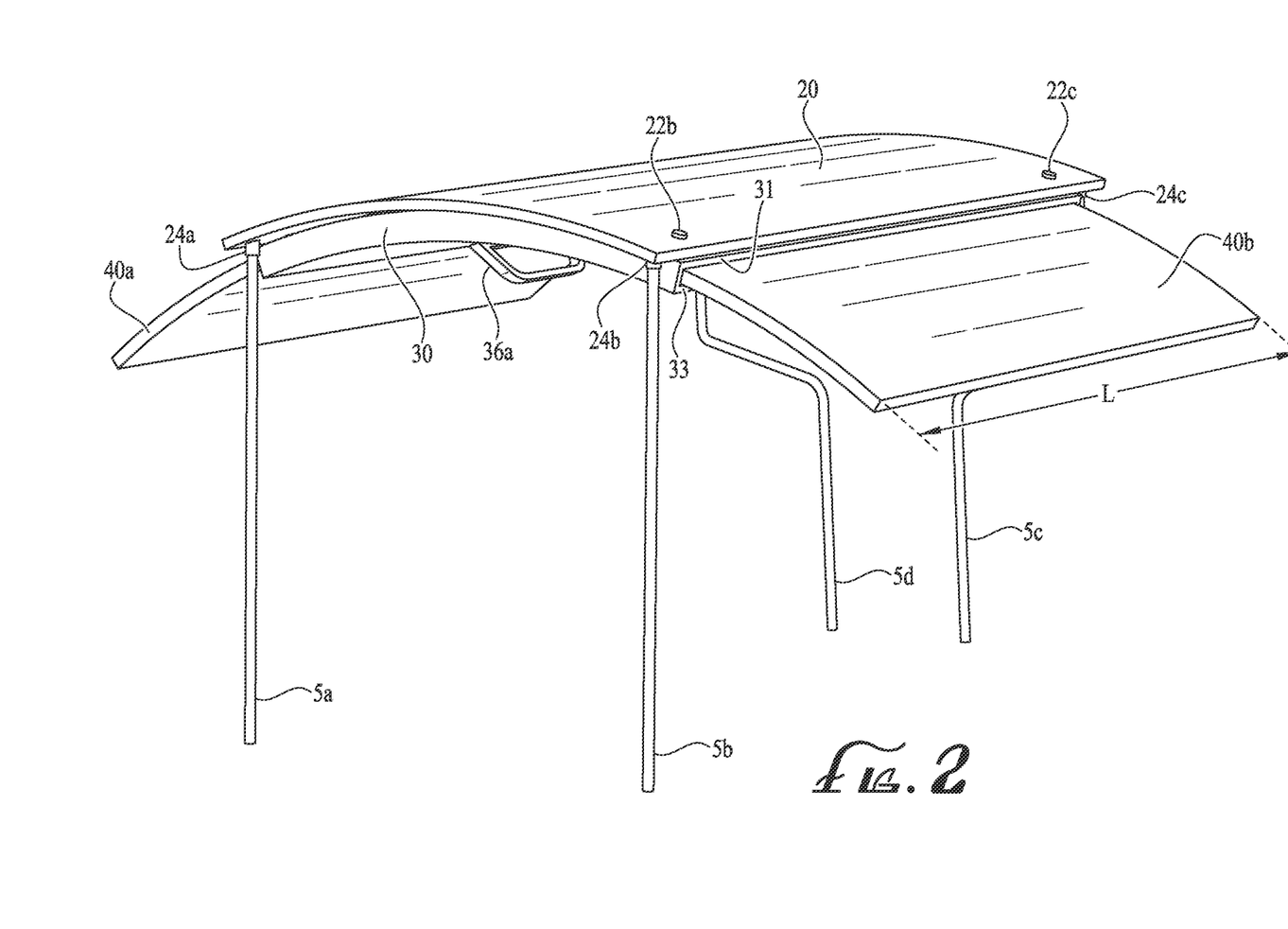
FIG. 2 shows the curved cart roof assembly of FIG. 1 with extended side panels.

Generally, the top panel 20 comprises a substantially flat, angled or radial profile, or any combination thereof, and may be fixed in position relative to the frame or structure of the cart. The housing compartment 30 is secured to the top panel 20, or integrally formed therein, and is configured for retaining the extension panels 40 in a retracted, storage position therein. The extension panels 40 are slidably or otherwise moveably attached to the housing compartment 30 allowing the user to move the panels from the storage position to an extended position wherein the extension panels provide additional coverage to one or more sides of the cart, for example on opposite first and second sides of the central main roof panel 20 as shown in FIG. 2. The cart roof assembly 10 may also comprise handles 36a, 36b integrated to the top panel 20, housing compartment 30, and/or extension panels 40. The handles 36a, 36b aid the users when entering and leaving the cart. One, two or more extension panels may be provided, for example to provide extended coverage on the sides, front and/or back of the main roof panel when deployed or extended.

According to example embodiments of the present invention, the frame securing elements 24a-24d are provided on the underside and near the corners of the top panel 20. The frame securing elements extend transversely from the underside of the top panel and comprise bores for push-fit engagement with top ends of the frame supports 5a-5d. In other example embodiments, the frame securing elements 24a-24d may comprise threaded bores for engaging frame supports with threaded ends. In some example embodiments, the frame supports 5a-5d may be integrated to or provided with the cart roof assembly 10.

In example embodiments, the cart top assembly 10 has a radial profile, as shown in FIGS. 1-2. The housing compartment 30 may be either integrated onto the top panel 20 or attached thereto by fastening means 22a-22d, such as for example mechanical fasteners, tie fasteners, magnets, push-fit connectors, and/or other suitable means. The housing compartment 30, having a first side, a second side, a first end, and a second end, comprises an open channel 50, extending from first side of the housing compartment to its second side, configured for receiving the extension panels 40. The housing compartment includes a top portion or side 31 above the open channel 50 and a bottom portion or side 33 below the open channel. According to example embodiments, integrated guides and/or sliding or roller tracks may be further incorporated in the channel to ease the movement and operation of the extension panels 40. The housing compartment 30 may also include locking safety mechanisms to prevent unintended deployment of the panels 40 and/or unintended removal of the extension panels 40 completely from the housing 30, such as, for example, spring latches, push pins, and integrated catches or other similar mechanisms known in the art.

In example embodiments, the roof extension panels 40 provide about 1 to about 4 feet of coverage on each side of the cart when the panels are extended. In some example embodiments, the panels may extend at least about 5%-10% the cart roof width, or more preferably at least about 25%-50% the cart roof width.

The length L of panels 40a, 40b may vary to substantially match the length of the cart top assembly 10 or cover only a portion thereof. For example, in some example embodiments, the panels 40 may be about 2 feet to about 3 feet in length to provide cover along a portion of the cart occupied by the passengers. In other example embodiments, the panels may be more than 3 feet and provide cover and protection along the entire side of the cart.

Figures 3, 4:
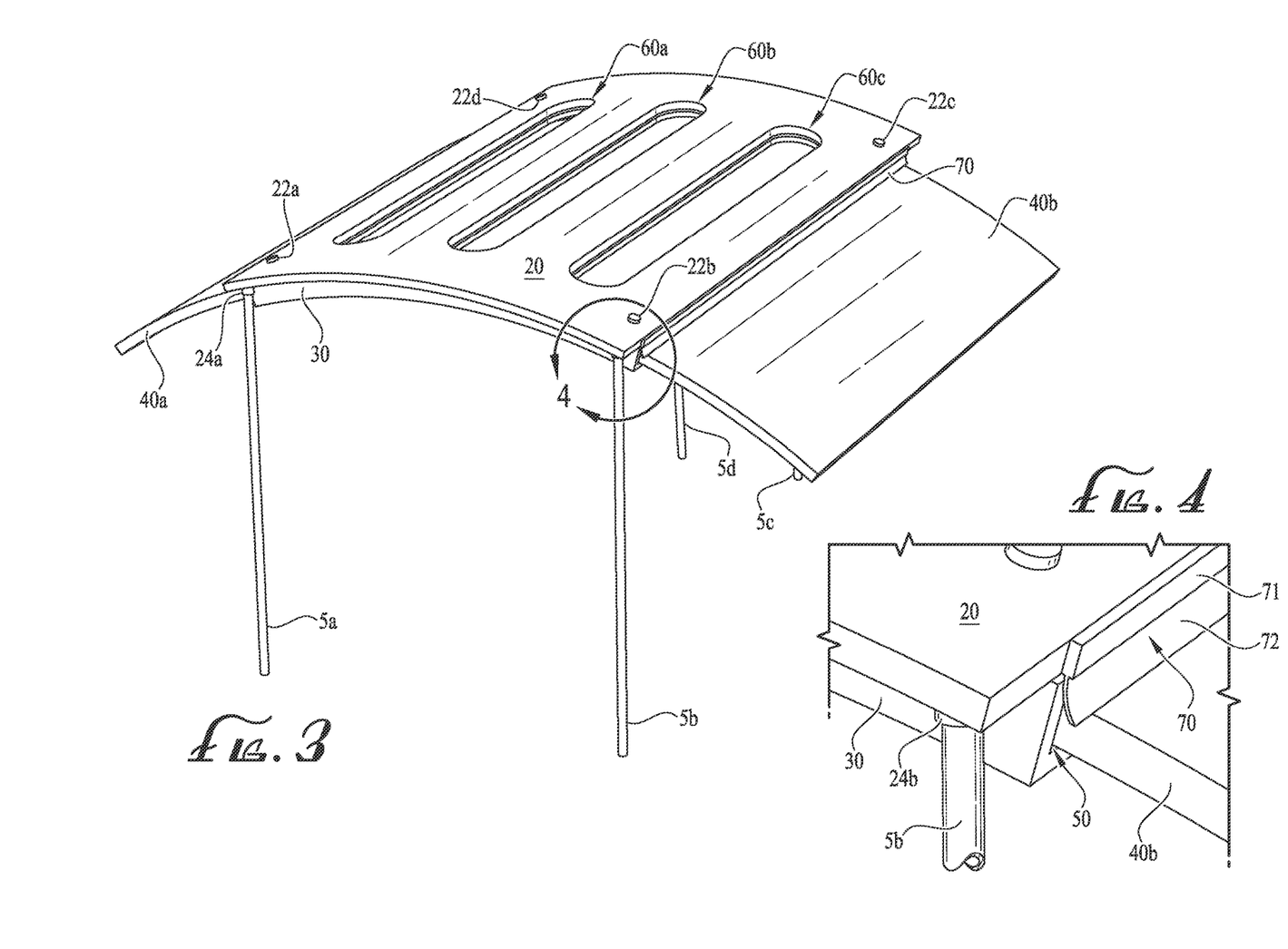
FIG. 3 is a perspective view of the curved cart roof assembly of FIG. 2 with at least one aperture for ventilation and at least one guide element for clearing moisture from the side panels as the panels are retracted back into a housing.
FIG. 4 is a detailed view of one of the guide elements of FIG. 3.

FIG. 3 shows an example embodiment of the cart assembly 10 further including ventilation slots or apertures 60a-60c. Excessive and prolonged moisture buildup inside the open channel can lead to mold, mildew and foul odors. The ventilation slots provide ventilation inside the housing compartment 30 to help dry and prevent excessive moisture buildup inside the open channel 50. In example embodiments, the ventilation slots 60a-60c extend through both the top panel 20 and the top side 31 of the housing compartment 30. While the ventilation slots of the depicted embodiment comprise oblong shapes, it will be appreciated by those skilled in the art that the ventilation slots may comprise other suitable shapes, such as for example, squares, rectangles, circles, polygons, or any combination thereof.

In example embodiments, the cart assembly 10 may further include squeegee or wiper elements 70 for sweeping or removing moisture, precipitation, and or debris accumulated on the top of the extension panels 40a, 40b during use, as best shown in FIGS. 3 and 4. Generally, wiper elements 70 comprise a firm base portion 71 and a flexible blade portion 72. The firm base portion 71 is adhered or attached to the side edges of the top panel 20 or top side 31 of housing 30 directly above the two openings of the open channel 50. At least some portion of the flexible blade portion 72 extends over the openings such that when the extension panels 40a, 40b are pulled out of the housing compartment 40, the leading edges of the extension panels push aside the flexible blade portion 72 and the leading edge of the flexible blade presses against the top side of the extension panels. After use, as the user pushes the extended panels 40a and 40b back into the housing compartment, the extension panels slide under, and in contact with, the wiper blades and thereby removes any moisture or debris accumulated atop the extension panels during use.

According to the example embodiments of the present invention, the cart roof top assembly 10 is preferably made uniformly from plastics and/or metals. However, it will be appreciated by those skilled in the art that other suitable materials may be considered, such as for example, glass, synthetic fibers, and composites and/or combinations thereof. It will also be appreciated by those skilled in the art that the top panel 20, housing 30 and extension panels 40 may all comprise the same material or different materials. For example, in some example embodiments, the side panels 40 may be made from a transparent plastic material while the top panel 20 and housing 30 are made from aluminum. In other example embodiments, the side panels 40, housing 30, and top panel 20 may all be made from a suitable opaque composite material. In yet another example embodiment, the side panels 40, housing 30, and top panel 20 may all be made from the same opaque plastic material but the side panels 40 may further comprise a transparent portion for visibility therethrough.

According to example embodiments, the extension panels are manually moved or operated by the user. Handles, grooves, and/or apertures may be further provided near and/or along the extension panels' leading edges for users to utilize when deploying the extension panels from the housing. In other example embodiments, the cart top assembly may further comprise a motor assisted panel driving system which allows the user to control the extension and retraction of the extension panels via a remote and/or centralized control. The panel driving system further includes at least one track or channel on which the extension panels travel, at least one electric motor, at least one cable or chain operably connected to the motor and extension panels, and at least one onboard battery or power source. The panel driving system may further include positional indicator display or lights which indicate to the user the position of the extension panels. Optionally, the system may include controls to prevent movement of the cart, to limit the cart's speed, and/or to provide an audible and/or visual warning to the user and cart occupants when the extension panels are deployed. The motorized system may further provide centralized- or remote-control capabilities.

Figure 5:
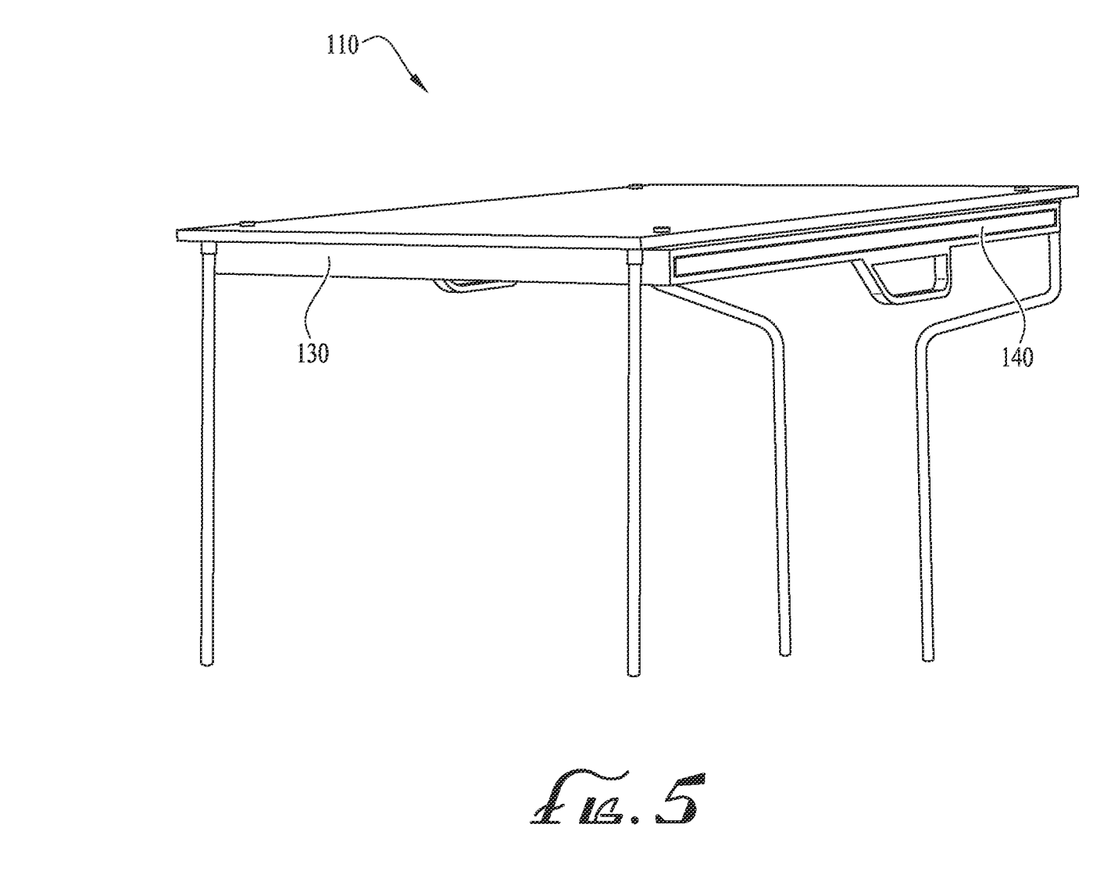
FIG. 5 shows a perspective view of a flat cart roof assembly with retracted side panels according to another example embodiment of the present invention.
Figure 6:
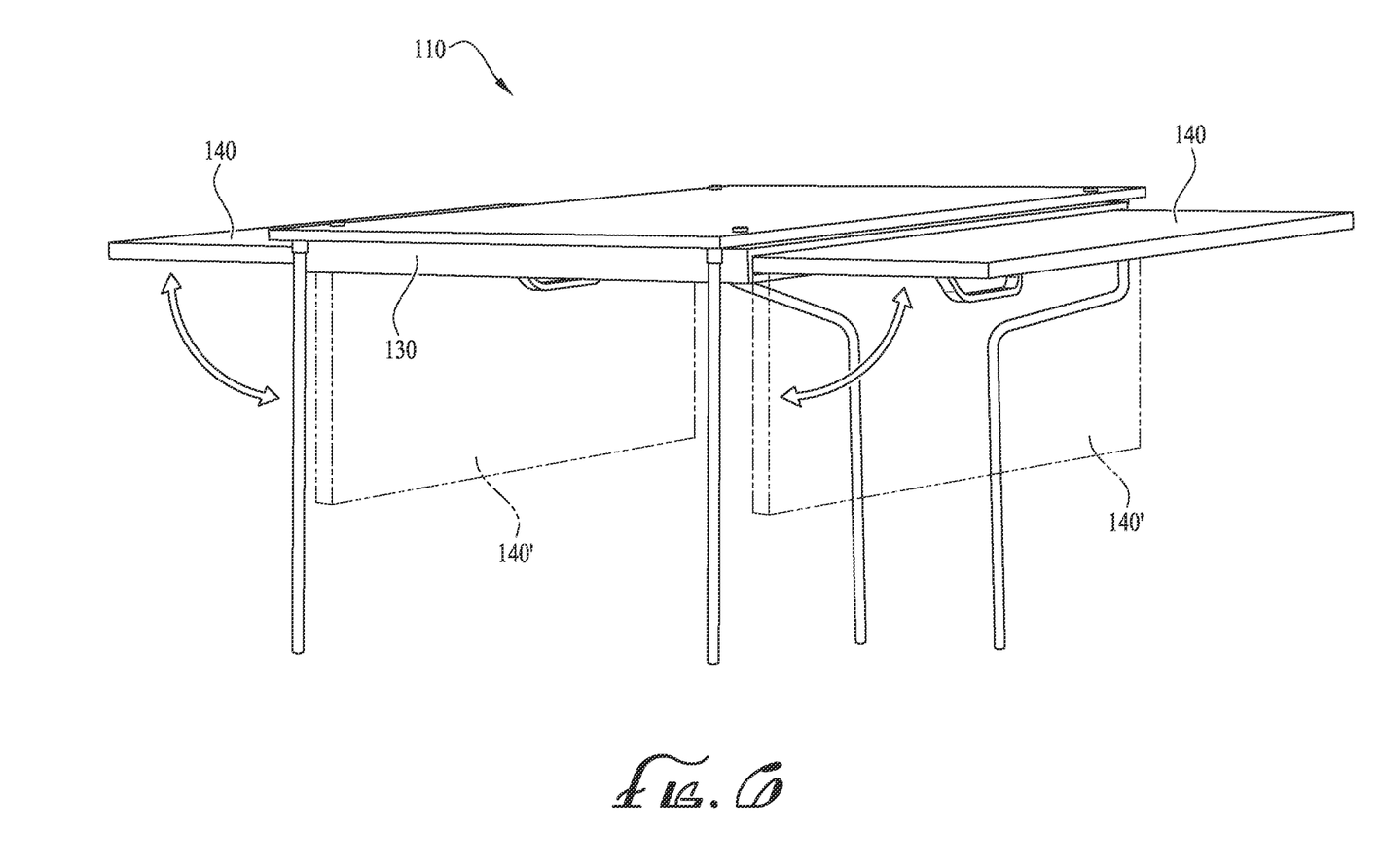
FIG. 6 shows the flat cart roof assembly of FIG. 3 with side panels in horizontal, or an alternate vertical, extended positions.

In other example embodiments, the cart top assembly 110 may comprise a substantially flat profile and/or further comprise an adjustable hinge and locking mechanism for positioning the extension panels 140 at various angles relative to the top panel, as shown in FIGS. 5-6. For example, in their fully extended position, the extension panels may be extended and locked in a position parallel to the top panel 140, hinged perpendicular thereto, or locked to any position therebetween.

In alternative embodiments, the extension panels may be affixed to or form a part of the main roof panel or cart structure, for example in the form of an accordion-folding extension, roller extension, or other extension mechanism.

In example embodiments, the cart roof top assembly 10 comprises a radial profile as shown in FIGS. 1 and 2. In other example embodiments, the cart roof top assembly may comprise an angled profile, such as for example, an upright triangle wherein a first half of the roof top assembly is sloped down towards a first side and a second half of the roof top assembly is sloped down towards a second side of the assembly from its center. Generally, the gravity-assisted movement of the extension panels is downward, from a higher first elevation to a lower second elevation. In some example embodiments, the radial and angled profiles are incorporated to utilize gravity and assist the users during deployment of the extension panels from the housing compartments and open channels. In such gravity-assisted deployments, extension of the extension panels may be entirely reliant on gravitation or, alternatively, gravitation may be utilized to assist the user by reducing the amount of force needed to extend the extension panels from the housing and ease the overall effort required in the deployment.

In example embodiments of the present invention, the cart roof top assembly is a replacement cart roof top for carts. In other example embodiments, the cart roof top assembly of the present invention may be attached or otherwise secured to existing roof tops on carts.

In example modes of use, the cart roof assembly 10 (110) is secured to the top support frame or an existing roof of a golf cart. In the stored position, the side extension panels 40 (140) are secured in a retracted configuration (FIGS. 1 and 5) within the housing 30 (130). When additional coverage is needed on the sides of the golf cart, for example in the event of heavy or wind-driven rain, the side extension panels 40 (140) are unlatched or released from housing 30 (130) and extended outwardly to the sides (FIGS. 2 and 6). Locking mechanisms are optionally provided within the assembly 10 (110) to ensure that the extension panels 40 (140) remain in the intended retracted and/or extended positions. In some example embodiments, the extension panels may be hinged and locked, for example up to 90 degrees, when fully extended to provide more immediate side protection. When additional coverage is no longer required or preferred, the extension panels 40 (140) are unlocked or released from the extended positions and retracted and secured back in the housing 30 (130).

While the invention has been described with reference to example embodiments, and more specifically to golf carts, it will be understood by those skilled in the art that a variety of modifications, additions and deletions are within the scope of the invention, and not limited to golf carts per se, as defined by the following claims.

What is claimed is:

1. A roof top assembly for a golf cart, the roof top assembly comprising:
   a roof top panel adapted to provide cover over the golf cart,
   a panel housing secured to the roof top panel, and
   a plurality of extension panels removably housed in the panel housing,
   wherein the panel housing comprises a channel for storing the extension panels in a first storage position,
   wherein the plurality of extension panels are co-planar to the panel housing in a second extended position,
   wherein the plurality of extension panels are transverse to the panel housing and hang down from the panel housing in a third extended position, and
   wherein each of the plurality of extension panels is moveable between the first storage position, second extended position, and third extended position independent of one another.

2. The roof top assembly of claim 1, wherein each of the plurality of extension panels extends more than one foot from the panel housing in the second extended position.

3. The roof top assembly of claim 1, wherein the plurality of extension panels are angularly adjustable relative to the panel housing between the second extended position and third extended position.

4. The roof top assembly of claim 3, wherein the extension panels are independently adjustable between 0 and 90 degrees, inclusive, relative to the panel housing.

5. The roof top assembly of claim 1, wherein movement of the plurality of extension panels between the first storage position, second extended position, and third extended position is automated.

6. The roof top assembly of claim 1, wherein the plurality of extension panels can be releasably locked in the first storage, second extended, and third extended positions.

7. The roof top assembly of claim 1, further comprising wiper elements for sweeping moisture and debris from surfaces of the plurality of extension panels as the extension panels are transitioned between the second extended position and the first storage position.

8. An extendable roof system for a golf cart having a top support frame, the extendable roof system comprising:
   a roof top panel having a radial profile and at least one frame securing element adapted to receive the top support frame,
   a panel housing attached to an underside of the roof top panel, the panel housing having a radial profile and including one or more internal channels, and a first side panel and a second side panel slidably engaged within the one or more internal channels, wherein the first side panel comprises a first radial profile and is reconfigurable between a horizontal and a vertical coverage configuration over a first side of the golf cart when the first side panel is extended from the panel housing, and wherein the second side panel comprises a second radial profile and is reconfigurable between a horizontal and a vertical coverage configurations over a second side of the golf cart opposite the first side when the second side panel is fully extended.

9. The extendable roof system of claim 8, wherein the first and second side panels provide about one to four feet of additional coverage adjacent the golf cart in the horizontal coverage configurations.

10. The roof top assembly of claim 1, wherein first halves of the roof top panel and panel housing are sloped down towards a first side of the golf cart and second halves of the roof top panel and panel housing are sloped down towards a second side of the roof top assembly.

11. The extendable roof system of claim 8, further comprising a squeegee to remove precipitation and debris off of the first and second side panels when the first and second panels are extended out of and retracted into the panel housing.

12. A method of using an extendable roofing system for a golf cart, the method comprising:

securing the extendable roofing system to a roof support frame of the golf cart, the extendable roofing system having a top panel, a plurality of retractable side panels, and a housing for the plurality of retractable side panels, releasing at least one of the plurality of retractable side panels from the housing, and extending the at least one of the plurality of retractable side panels out from a storage position within the housing to one of two extended positions outside the housing, the two extended positions comprising a first horizontal position substantially parallel to the housing and a second transverse position substantially perpendicular to the housing.

13. The method of using an extendable roofing system for a golf claim 12, further comprising hinging the at least one retractable side panel to a desired angular position between the first horizontal position and the second transverse position when fully extended.

14. The method of using an extendable roofing system for a golf cart of claim 12, further comprising restoring and securing the at least one of the retractable side panels back into the storage position within the housing.

15. The roof top assembly of claim 1, wherein the roof top panel and panel housing comprise one or more openings providing ventilation to an interior of the panel housing.

16. The roof top assembly of claim 1, wherein the roof top assembly has a width and the plurality of extension panels are extendable up to 50% of the width of the roof top assembly.

17. The extendable roof system of claim 8, wherein the at least one frame securing element protrudes transversely from an underside of the roof top panel and comprises a bore adapted for receiving at least a portion of the golf cart top support frame.

18. The extendable roof system of claim 17, wherein the bore of the at least one frame securing element is threaded for threaded engagement to the top support frame of the golf cart.

* * * * *